United States Patent Office 3,399,181
Patented Aug. 27, 1968

3,399,181
COMPOUNDING AND CURING NEOPRENE RUBBER
Gary A. Bornemann and William F. McIlhenny, Lake Jackson, Tex., and Jay D. Gensler, Edgewood Arsenal, Md., assignors to The Dow Chemical Company, Midland, Mich., a corporation of Delaware
No Drawing. Filed Oct. 24, 1965, Ser. No. 504,995
5 Claims. (Cl. 260—92.3)

The invention relates to an improvement in the method of processing neoprene rubber.

Neoprene is the name applied to polymers of chloroprene-base synthetic elastomers. Chloroprene is 2-chloro-1,3-butadiene. The polymer may be considered to consist largely of a mixture of two isomers, of which the major portion is that having the formula:

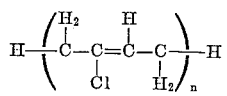

which is the trans-1,4 form; and
of which the minor portion is that having the formula:

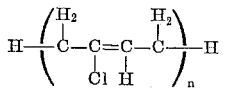

which is the cis-1,4 form.

There are also usually present a small percent of each of the 1,2 and 3,4 forms. The $n$ is an integer controlled by the extent of polymerization. Methods of preparing neoprene are well known. Reference to The Neoprenes by Murray and Thompson (1963) published by E. I. du Pont de Nemours and Company, Wilmington, Del., is suggested.

Neoprene is cured commercially by admixture therewith of suitable curing agents and heat curing the compounded mixture, employing either steam or dry heat, to provide a vulcanizate which possesses properties making it particularly suitable for a large number of specific uses.

Neoprene is usually compounded employing equipment of the nature commonly employed for other types of synthetic rubber or for natural rubber, i.e. it may be mechanically worked and compounding ingredients admixed therewith, prior to cure, in internal mixers of the Banbury type or on open mills of the roller type. A typical recipe for compounding neoprene preparatory to curing contains, in addition to the neoprene, the following ingredients:

a peptizer, e.g. stearic acid;
an acid acceptor, e.g. MgO;
an anti-oxidant, e.g. phenyl-a-naphthylamine;
a reinforcing agent, e.g., carbon black;
plasticizer or process oil, e.g. a petroleum oil;
an accelerator, e.g. 2-mercaptoimidazoline;
a vulcanizer, e.g. ZnO.

Sulfur is occasionally used as a supplemental vulcanizing agent to produce special properties in the vulcanizate. An accelerator to cure is not essential but is almost invariably used for practical reasons.

General discussions on neoprene preparation, compounding, and cure may be found in textbooks on rubber-like polymers or synthetic rubber, e.g. The Neoprenes, ibid.; Synthetic Rubber, edited by G. S. Whitey (1954), published by John Wiley and Sons, Inc., New York; The Vanderbilt Rubber Handbook (1958) published by R. T. Vanderbilt Company, Inc., New York.

No vulcanizing agent for neoprene singly or in combination has yet been found to surpass MgO and ZnO in combination. In Synthetic Rubber, ibid., p. 775, the statement is made in reference to the use of both MgO and ZnO that "This recommendation has never been supplanted." Reasons for the superior performance of MgO and ZnO in combination is not fully understood. The use of ZnO as the sole curing agent produces both a fast cure and a uniform cure resulting in what is referred to as "flat curing." Such cure tends to yield a product which is described as "scorchy" due to the leveling off of the cure at a relatively low point. (Scorchy is a term used in the rubber industry to indicate vulcanization occurring during compounding and milling operations.) On the other hand the use of MgO as the sole curing agent produces neoprene vulcanizates which cure slowly but wherein the curing activity tends to persist. The combination of the two metallic oxides overcomes the deficiencies of either used alone. The MgO is considered to act as a scavenger for HCl liberated by neoprene during cure and therefore controls the reaction. It is thought that the MgO competes with the ZnO during vulcanization when the two are present together. The curing activity of neoprene is largely due to labile chlorine in an allylic position resulting from a small percentage of 1,2 addition during the predominately 1,4 polymerization of chloroprene. Cross-linking takes place at these sites.

One disadvantage which has been associated with the conventional use of MgO and ZnO to obtain the benefit of both to cure neoprene is that the MgO must be admixed with the uncured neoprene well ahead of the ZnO. If a cure is attempted by admixing the ZnO and the MgO together or at the same time according to known practice, the ZnO usurps the curing sites and produces the fast "flat cure" characterized by the scorchy condition described above. On the other hand, when the curing of neoprene is carried out by first admixing MgO with the neoprene and uniformly dispersing it therein, prior to contacting the neoprene, with ZnO, the two metallic oxides supplement each other to produce well balanced stocks, the properties of which can be varied to advantage by adjusting the ratio of oxides. The ratio of MgO/ZnO by weight may be varied rather widely, as suggested on pp. 785–789 of Synthetic Rubber, ibid. However, the ratio of MgO/ZnO in neoprene mixtures for practical use is usually 1 to 10/10 to 1 or about 0.1 to 10 parts by weight of MgO per part of ZnO.

Mixing an ingredient into neoprene rubber is a dry mixing process requiring equipment, labor, and time including masticating, banding and calendering. This procedure is substantially the same whether but one ingredient or several are being incorporated into the mixture at the same time. Accordingly, the necessity of admixing MgO thoroughly with the neoprene and thereafter, in a separate mixing operation, admixing the ZnO therewith increases the cost of the compounding process appreciably.

A need accordingly exists for a method of compounding neoprene whereby both the MgO and the ZnO can be admixed with the neoprene at the same time. The invention meets this need. The manner and means for attaining this end are described hereinafter and defined in the annexed claims.

The invention is predicated on the discovery that a ZnO nucleus or substrate may be coated with a MgO outer layer and the resulting coated particulate material admixed with neoprene whereby the MgO of the outer layer first contacts the neoprene, becomes intermixed therewith, and subsequently the ZnO contacts the neoprene containing the MgO and effects cross-linking thereof.

The structure of the nature of the MgO-coated substrate of ZnO is sometimes referred to as a microcomposite since the substarte consists of a single grain or a relatively small cluster of grains of ZnO and the outer coating is a relatively thin layer, usually less than 1 micron in thickness, of amorphous MgO.

The invention is practiced by preparing the particulate microcomposite (sometimes hereinafter called merely composite) material comprising nuclei or cores of ZnO coated with MgO, as described above, and thereafter admixing the so made particulate composite with neoprene and curing the resulting neoprene-metallic oxide mixture.

A particularly suitable way of preparing such particulate composite consisting of the ZnO nuclei and the MgO outer coating is described in application Ser. No. 357,793 filed Apr. 6, 1964 by John Malcolm Lee and Jay D. Gensler of which one of the inventors thereof is a coinventor of the instant invention.

Briefly, the material is prepared according to said application by solubilizing MgO in water containing $CO_2$ or into which $CO_2$ is passed to form $MgCO_3$ and then admixing ZnO therewith, heating the resulting slurry to between about 70° C. and the boiling point of the slurry which causes deposition of $MgCO_3$ on the ZnO substrate. The thus produced composite is then calcined at a temperature above the decomposition of $MgCO_3$, e.g. about 410° C. for about 5 hours to drive off $CO_2$ to yield an outer layer of MgO on the ZnO. After being pulverized, to break up any clusters, the microcomposites so made when viewed through an electron microscope resemble uniformly spaced sparkling spheres. An electron microscope photograph shows the surface of the composite to be composed of thin sheets of MgO substantially of submicron dimensions and to be composed of nearly amorphorous MgO rather than the crystal form normally associated with MgO.

The ratio of MgO to ZnO in the microcomposite may be varied to provide the desired ratio for curing neoprene. Such ratio is dependent largely upon the cure rate and the properties of the neoprene vulcanizate desired. Usually the higher the ratio of MgO/ZnO the slower the curing rate and the greater the resistance to scorch. As a corollary thereof the lower the rate of MgO/ZnO, the faster the cure but the lower the ultimate cure value in addition to a greater tendency to scorch. Reference may be made to The Neoprenes ibid., pages 21 to 22 wherein the effects of varying the ratio of MgO/ZnO are graphically shown.

A common weight ratio of MgO/ZnO to employ is about 4/5. To illustrate the practice of the invention, composite particulate material consisting of a substrate of ZnO having a superstrate or coating of MgO were prepared in accordance with the above described procedure including calcining at 410° C. for 5 or 6 hours, employing amounts so as to result in weight proportions of 4 MgO to 5 ZnO. For comparative purposes MgO as a separate material was independently added, followed, after thoroughly mixing it into the neoprene, by ZnO. In the examples of the invention and comparative run the following amounts of materials were employed.

| Ingredient: | Weight in grams |
| --- | --- |
| Stearic acid | 4.5 |
| MgO | 18.0 |
| Phenyl-a-naphthylamine | 9.0 |
| Carbon black | 130.0 |
| ZnO | 22.5 |
| Neoprene GNA[1] | 450.0 |
| Total | 634.0 |

[1] Neoprene GNA is a somewhat faster curing neoprene containing thiuram and an amine stabilizer (as described on page 2 of The Neoprenes, ibid.). Other types of neoprene may be used in the above recipe with satisfactory results.

The examples of the invention were carried out by placing the neoprene on a roller mill and banding it to the roller, within about a minute. During the next 2 minutes, 4.5 grams of stearic acid were admixed with the neoprene on the mill. During the next 4 minutes (within 7 minutes from the time the neoprene was placed on the mill), 9 grams of phenyl-a-naphthylamine and the composite consisting of a MgO outer layer and a ZnO substrate were admixed with the neoprene stock. 130 grams of carbon black were then blended with the neoprene stock on the roller mill, during the next 8 minutes. After a total of 15 minutes, from the time the neoprene was first put in the mill, the material was cut and mixed on the rolls for an additional 2 minutes. Thereafter the material was cut from the rolls, mixed, folded back, and put through the rolls 6 times during the next 2 minutes of operation. The material was then calendered over the next minute. This was a total time of 20 minutes from the time the neoprene was first placed on the mill and compounding was completed.

The thus compounded neoprene was tested on a Mooney plastometer to obtain the scorch value. A Mooney value, obtained on a Mooney plastometer, shows the torque required to turn a rotor of exact specifications at constant speed in a confined sample of a rubber under test which is maintained at a constant temperature. Change in plasticity as the test proceeds is due to the shearing action of the rotating disc. Among the many references on the Mooney test and plastometer is Modern Synthetic Rubbers by Barron, pp. 242 to 244 (1949), published by Chapman and Hall Ltd., London. A rise in Mooney value of 10 points is often taken for evaluation of scorch tendencies of a rubber. The temperature of the Mooney test employed in the examples and comparative test was 250° F. Readings were recorded every minute until a rise of 10 points was shown. The scorch time as used herein is the elapsed time in minutes between the start of the run and a 10-point rise.

An example of the practice of the invention was conducted according to the above procedure employing 40.5 grams of a MgO-ZnO composite consisting of 18 grams of MgO outer layer and 22.5 grams of ZnO substrate which resulted in a 4/5 proportion of MgO to ZnO. The compounded neoprene so made was given the Mooney scorch test which showed a 10-point rise in 45 minutes.

Another example of the invention was carried out employing the same 4 MgO-5 ZnO weight ratio composite employed in Example 1, except that it was pulverized through a multiple-hammer pulverizing mill provided with 0.008-inch slits (to break up any clusters of the microcomposite), following calcining for 6 hours at 410° C. Neoprene GNA was compounded as above but employing the pulverized composite. It was then given the Mooney scorch test. The test showed a rise of 10 points in 46 minutes.

A third example of the invention was carried out employing instead of the MgO-ZnO composite of 4 MgO:5 ZnO employed above, a composite consisting of proportions of 2 MgO to 5 ZnO by weight, prepared as described in Example 2, except that the calcining time was 5 hours at 410° C. prior to pulverizing. The amount of the composite employed was 31.5 grams, consisting of 9 grams MgO and 22.5 grams of ZnO, per 450 grams of Neoprene GNA. The total time of compounding on the mill again was about 20 minutes. The Mooney scorch test was given the so compounded neoprene and showed a 10-point rise in 30.5 minutes. The shorter time was to be expected due to the larger proportion of ZnO over MgO employed.

It can be seen, by reference to the scorch tests obtained on the compounded neoprene of the examples, that the practice of the invention produced highly satisfactory neoprene stock for curing. The neoprene thus compounded according to the invention may then be satisfactorily cured by placing it in an oven, either heated by dry air or steam at between about 280° F. and about 340° F. from about 4 minutes to about 40 minutes, e.g. 307° F. for 10 minutes. Advanced pressures (press cures) may be used if desired. A Mooney scorch value of about 30 to 50 minutes is an indication of a satisfactory curing compounded rubber. The higher the curing temperature, the shorter the curing time required. A relatively high, temperature and short cure time are usually preferred. Cure time in air may roughly be reduced about one half at increase in curing temperature of 18° to 20° F. The exact combination of temperature and time depends upon the formulation used, the molds used, and the thickness of the neoprene product.

For purposes of comparison, a test was made following recommended practice employed in the industry. The same ingredients as were employed in the examples of the invention were employed except that instead of the composite of MgO coated on ZnO substrate, MgO was added early in the compounding procedure followed, as soon as feasible, by the addition of ZnO. The time schedule, of necessity, was adjusted to conventional requirements and required a minimum time of 23 minutes.

In the comparative test, the time schedule followed is set out below:

| Completed Operation: | Total Time in Minutes from Time Neoprene was Placed on Rolls |
|---|---|
| Banded on rolls | 0–1 |
| Added stearic acid | 1–3 |
| Added MgO and phenyl-a-naphthylamine | 3–7 |
| Added carbon black | 7–15 |
| Added ZnO | 15–18 |
| Cut and mixed on rolls | 18–19 |
| Cut off rolls, mixed and folded, and put back through rolls 6 times | 19–22 |
| Rolled out into sheet | 22–23 |

Reference to the examples shows that the results obtained by employing the composite, consisting of ZnO coated with MgO, produced equally satisfactory compounded neoprene for curing as did that which was made in the comparative run by adding the MgO first and waiting 8 minutes (from 7 minutes to 15 minutes total milling time) before beginning to add the ZnO. In the practice of the invention, both MgO and the ZnO are provided by the end of 7 minutes total milling time and only one mixing operation is then required since the MgO, being on the outer surface of the particles, comes in contact with the neoprene first and reacts therewith prior to any substantial contact and reaction of the neoprene with the ZnO. The saving in time was 3 minutes. However, a saving of 3 minutes for each milling provides a significant economic saving. The milling time during the addition of ingredients will, of course, vary with the amount of ingredient being added, the ease with which the ingredient disperses in the rubber, and the degree of homogeneity desired.

Although composites consisting of a substrate or nuclei of ZnO coated with MgO are presently the most acceptable combination for curing neoprene, it is within the spirit of the invention to cure neoprene by employing other composites of metallic oxides wherein another oxide is substituted for one or both of the MgO or ZnO, e.g. CaO or $Al_2O_3$ may be substituted for the ZnO under certain conditions. This discovery that MgO may thus be formed and made to adhere tenaciously to a substrate of another metallic oxide wherein both oxides employed are desirably reacted successively in the compounding of neoprenes, rather than concurrently, is of far-reaching importance.

Having described our invention what we claim and desire to protect by Letters Patent is:

1. In the method of vulcanizing a polychloroprene type synthetic elastomer wherein MgO and ZnO are brought into contact with the unvulcanized elastomer and the resulting reaction mixture cured to form a vulcanizate, the improvement which comprises (a) providing a particulate composite consisting essentially of ZnO nuclei having a surface coating of MgO, the weight ratio of MgO:ZnO in said composite being suitable for curing a polychloroprene type synthetic elastomer, (b) admixing said composite with said unvulcanized elastomer, and (c) heat-curing the resulting mixture to produce a vulcanizate.

2. The method according to claim 1 wherein said composite contains, by weight, from about 0.1 to about 10.0 parts of MgO per part of ZnO.

3. The method of compounding neoprene rubber employing both MgO and ZnO which comprises preparing a composite consisting of granules consisting of nuclei of ZnO coated with a layer of MgO adhered thereto, the weight proportions of MgO/ZnO being from about 0.1 to about 10.0 parts of MgO per 1.0 part of ZnO, and admixing the composite granules so made with the neoprene at an early stage in the compounding cycle when only the immediate action of the MgO is desired and the action of the ZnO is subsequently desired.

4. The method according to claim 3 wherein the weight proportions of MgO/ZnO are from about 2.0 to 5.0 parts of MgO per part of ZnO.

5. The method of milling neoprene vulcanizate rubber which consists essentially of heating the compounded neoprene rubber of claim 4 at a temperature of between about 280° F. and about 340° F. for a period of about 4 to 40 minutes.

References Cited
UNITED STATES PATENTS

| 3,310,545 | 3/1967 | Becker | 260—923 |
| 3,310,546 | 3/1967 | Becker | 260—923 |

JOSEPH L. SCHOFER, *Primary Examiner.*

W. HAMROCK, *Assistant Examiner.*